United States Patent Office 3,752,763
Patented Aug. 14, 1973

3,752,763
DRILLING FLUID
Mahmoud S. Kablaoui and Jack H. Kolaian, Wappingers Falls, N.Y., assignors to Texaco Inc., New York, N.Y.
No Drawing. Continuation-in-part of application Ser. No. 84,458, Oct. 27, 1970, now abandoned. This application Apr. 26, 1972, Ser. No. 247,642
The portion of the term of the patent subsequent to Feb. 15, 1989, has been disclaimed
Int. Cl. C10m 3/14, 3/20
U.S. Cl. 252—8.5 C
10 Claims

ABSTRACT OF THE DISCLOSURE

An aqueous drilling fluid dispersant and a method of drilling wells using as the drilling fluid dispersant a 4-vinyldihydroxybenzene compound.

---

This application is a continuation-in-part application of application Ser. No. 84,458, filed Oct. 27, 1970, now abandoned, entitled "Drilling Fluid."

This invention relates to a novel aqueous drilling fluid for drilling wells through sub-surface formations by means of well drilling tools, and particularly to such an aqueous well drilling fluid having improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise) has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a 4-vinyldihydroxybenzene compound selected from the group consisting of 4-vinyl-1,2-dihydroxybenzene, 4-$\alpha$-methylvinyl-1,2-dihydroxybenzene, 4-$\alpha$-formoxyvinyl-1,2-dihydroxybenzene, 4 - $\alpha$-acetoxyvinyl-1,2-dihydroxybenzene and mixtures of such compounds.

These compounds can be prepared in a known manner. For example, the 4-$\alpha$-acetoxyvinyl species can be prepared by acetylation of catechol followed by Fries Rearrangement to form 4-acetyl catechol, Rosemund and Lohfert, Ber. 61, 2601 (1928); Miller et al. JACS, 60, 7 (1938). Further acetylation of 4-acetyl catechol, as described by Mao et al., J. Org. Chem., 34, 1425 (1969), and hydrolysis of the resulting diacetate by refluxing in 10% hydrochloric acid for two hours results in the formation of the 4-$\alpha$-acetoxyvinyl species. The 4-$\alpha$-formoxyvinyl species is prepared in a similar manner except that after forming the 4-acetyl catechol, formic acid is used instead of acetic acid. The 4-vinyl species is prepared by acetylating catechol followed by hydrogenation and dehydration. The 4-$\alpha$-methylvinyl species is prepared by alkylation of catechol with propenylacetate followed by deacetylation.

It is known from the article appearing in Zhur. Priklad. Khem. 35, pages 638–647 (1963), "Organic Viscosity Reducers in Clay Solutions" by D. Tischenko and S. Fleisher (CA, 57, 2491g, 1962), that the ortho-dihydroxybenzenesulfonic acids, the ortho-dihydroxyalpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The 4-vinyl-dihydroxybenzene compounds of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 pounds per barrel are economically unattractive and no improved results are obtained therein. A preferred range for the 4-vinyldihydroxybenzene compounds of the present invention is from about 0.25 to about 7 pounds per barrel of drilling fluid for most consistent results and efficiency.

Yield Point (YP) is calculated by subtracting the Plastic Viscosity (PV) from the Fann Viscosity reading at 300 r.p.m. Plastic Viscosity (PV) is obtained by calculation, subtracting the Fann reading at 300 r.p.m. from the 700 r.p.m. reading. Apparent Viscosity (AV) is equal to one-half of the Fann Viscosity reading obtained at 600 r.p.m. The fluidity of a mud can be back calculated from these data, the results being expressed in Fann Viscosity at 600 r.p.m. and 300 r.p.m. for a direct reading viscosimeter.

The properties of the base muds are shown in the table.

The test data set forth in the following table indicate the surprising advantages of the 4-vinyldihydroxybenzene compounds of the present invention and demonstrate the beneficial results of same in improving the dispersibility of drilling fluids.

Representative physical properties of drilling fluids both before and after addition of the 4-vinyldihydroxybenzene compounds of the present invention are shown in the table.

In each example the amount of material or materials added to the base mud, if any, is shown, expressed in terms of pounds of material per barrel of drilling fluid.

TABLE

| Ex. | Additional additive, lbs. | Type mud | Amount (lbs./bbl.) and type dispersant | PV | YP | Ap. vis., cpe. | pH |
|---|---|---|---|---|---|---|---|
| | | Base mud | | 6 | 72 | 45 | |
| 1 | | LpH [1] | 0.50 [2] | 20 | 23 | | 8.1 |
| | | | 1.0 | 18 | 28 | 32 | 7.5 |
| 2 | Caustic to attain pH 9.4–9.5 | LpH | 0.50 [2] | 23 | 16 | 31 | 9.5 |
| | do | | 1.0 | 26 | 20 | 36 | 9.4 |

[1] LpH = Low pH field mud.
[2] 4-α-acetoxyvinyl-1,2-dihydroxybenzene.

The table above shows that the preferred species 4-α-acetoxyvinyl-1,2-dihydroxybenzene compound, of the present invention is an effective dispersant in low pH drilling fluids at concentrations of from 0.5 to 1 pound per barrel.

We claim:

1. An aqueous drilling fluid containing clay solids and as the dispersant at least 0.1 pound per barrel of drilling fluid of a 4-vinyldihydroxybenzene compound selected from the group consisting of 4-vinyl-1,2-dihydroxybenzene, 4-α-methylvinyl-1,2-dihydroxybenzene, 4-α-formoxyvinyl-1,2-dihydroxybenzene, 4-α-acetoxyvinyl-1,2-dihydroxybenzene, and mixtures thereof.

2. An aqueous drilling fluid as claimed in claim 1 wherein the 4-vinyldihydroxybenzene compound is 4-vinyl-1,2-dihydroxybenzene.

3. An aqueous drilling fluid as claimed in claim 1 wherein the 4-vinyldihydroxybenzene compound is 4-α-acetoxyvinyl-1,2-dihydroxybenzene.

4. An aqueous drilling fluid as claimed in claim 1 wherein the 4-vinyldihydroxybenzene is a mixture of 1,4-vinyl-1,2-dihydroxybenzene and 4-α-acetoxyvinyl-1,2-dihydroxybenzene.

5. An aqueous drilling fluid as claimed in claim 1 wherein the 4-vinyldihydroxybenzene compound is present in the drilling fluid in an amount of from about 0.1 to about 10 pounds per barrel of drilling fluid.

6. An aqueous drilling fluid as claimed in claim 1 wherein the 4-vinyl-dihydroxybenzene compound is present in the drilling fluid in an amount of from about 0.25 to about 7 pounds per barrel of drilling fluid.

7. In a method of drilling wells wherein a drilling fluid is passed through the well in contact with earth formations during the drilling operation, the improvement which comprises contacting said earth formations with an aqueous drilling fluid containing clay solids and as the dispersant at least 0.1 pound per barrel of drilling fluid of a 4-vinyldihydroxybenzene compound selected from the group consisting of 4-vinyl-1,2-dihydroxybenzene, 4-α-methylvinyl-1,2-dihydroxybenzene, 4-α-formoxyvinyl-1,2-dihydroxybenzene, 4-α-acetoxyvinyl-1,2-dihydroxybenzene, and mixtures thereof.

8. A method as claimed in claim 7 wherein the 4-vinyldihydroxybenzene compound is 4-vinyl-1,2-dihydroxybenzene.

9. A method as claimed in claim 7 wherein the 4-vinyldihydroxybenzene compound is 4-α-acetoxyvinyl-1,2-dihydroxybenzene.

10. A method as claimed in claim 7 wherein the 4-vinyldihydroxybenzene compound is a mixture of 4-vinyl-1,2-dihydroxybenzene and 4-α-acetoxyvinyl-1,2-dihydroxybenzene.

References Cited
UNITED STATES PATENTS

| | | | |
|---|---|---|---|
| 1,999,766 | 4/1935 | Lawton et al. | 252—8.5 |
| 2,333,133 | 11/1943 | Wayne | 252—8.5 |
| 2,894,993 | 7/1959 | Schmerling | 260—625 X |
| 3,256,336 | 6/1966 | Lange | 260—488 |
| 3,535,239 | 10/1970 | Kolaian | 252—8.5 |
| 3,642,622 | 2/1972 | Kablaoui et al. | 252—8.5 |

HERBERT B. GUYNN, Primary Examiner

U.S. Cl. X.R.

252—351, 356; 260—488 CD, 625